United States Patent
Ebbesen et al.

(10) Patent No.: US 10,364,793 B2
(45) Date of Patent: Jul. 30, 2019

(54) MAINTENANCE ACCESS TO BLADE BEARING

(71) Applicant: SIEMENS AKTIENGESELLSCHAFT, München (DE)

(72) Inventors: Henning Ebbesen, Skjern (DK); Torben Lauritsen, Holstebro (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 376 days.

(21) Appl. No.: 15/214,546

(22) Filed: Jul. 20, 2016

(65) Prior Publication Data
US 2017/0067438 A1 Mar. 9, 2017

(30) Foreign Application Priority Data
Sep. 7, 2015 (EP) .................................... 15184070

(51) Int. Cl.
*F03D 1/06* (2006.01)
*F03D 80/70* (2016.01)
*F03D 80/50* (2016.01)

(52) U.S. Cl.
CPC ......... *F03D 1/0691* (2013.01); *F03D 1/0675* (2013.01); *F03D 80/50* (2016.05);
(Continued)

(58) Field of Classification Search
CPC ...... F03D 1/0691; F03D 1/0675; F03D 80/50; F03D 80/70; Y02P 70/523; F05B 2230/80; F05B 2240/50; Y02E 10/721
(Continued)

(56) References Cited

U.S. PATENT DOCUMENTS 6,285,090 B1 * 9/2001 Brutsaert ............ F03D 7/0272
290/55
6,921,243 B2 * 7/2005 Canini .................. H02K 7/102
415/4.3
(Continued)

FOREIGN PATENT DOCUMENTS

CN 104295439 A 1/2015
CN 104870807 A 8/2015
(Continued)

OTHER PUBLICATIONS

Extended European search report for Application No. 15184070.9-1607; 6 pgs.

*Primary Examiner* — Craig M Schneider
*Assistant Examiner* — David R Deal
(74) *Attorney, Agent, or Firm* — Schmeiser, Olsen & Watts LLP

(57) ABSTRACT

An improved access to the bearing of a wind turbine rotor blade is provided. A rotor of a wind turbine, includes a rotor blade and a hub, whereby the rotor blade includes a root end and the root end is attached to a rotor blade bearing, and the rotor blade bearing is attached to the hub. The rotor blade includes a root section 6, adjacent to the root end, including the outer surface of the rotor blade. The root section of the rotor blade is covered by a housing. The housing includes a wall section that leads at least partially circumferentially around the root section of the rotor blade. The housing includes a cover section to at least partially close the gap between the wall section of the housing and the rotor blade. The housing defines an aisle that leads circumferentially around the root section of the rotor blade to provide access to the blade bearing and to allow a worker to perform service work at the blade bearing.

9 Claims, 5 Drawing Sheets

Figure 1:
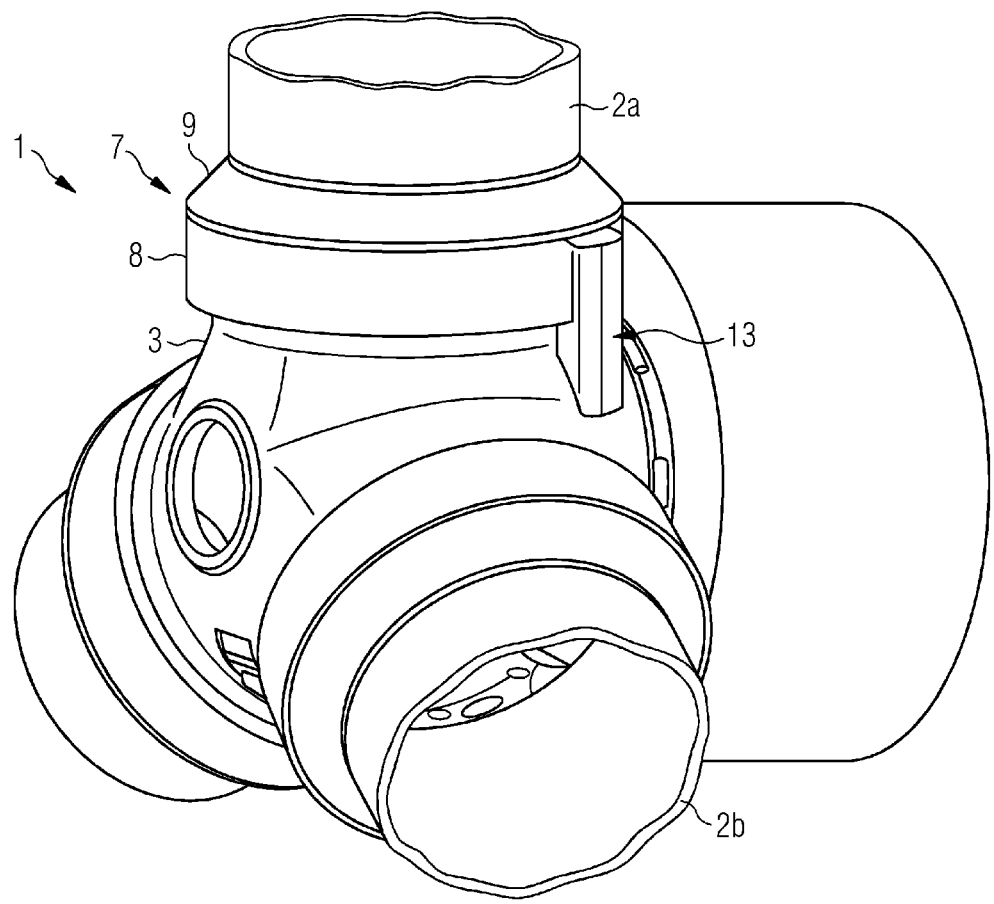

(52) U.S. Cl.
CPC .......... *F03D 80/70* (2016.05); *F05B 2230/80* (2013.01); *F05B 2240/50* (2013.01); *Y02E 10/721* (2013.01); *Y02P 70/523* (2015.11)

(58) Field of Classification Search
USPC ........................................................ 416/147
See application file for complete search history.

(56) References Cited

U.S. PATENT DOCUMENTS

| | | | | |
|---|---|---|---|---|
| 7,205,678 | B2* | 4/2007 | Casazza | F03D 1/025 |
| | | | | 290/55 |
| 8,562,300 | B2* | 10/2013 | Bertolotti | F03D 1/00 |
| | | | | 416/204 A |
| 9,790,916 | B2* | 10/2017 | Valero Lafuente | F03D 80/00 |
| 2003/0230899 | A1* | 12/2003 | Torres Martinez | F03D 1/0691 |
| | | | | 290/55 |
| 2008/0104821 | A1* | 5/2008 | Erill | B25B 27/0092 |
| | | | | 29/450 |
| 2010/0129216 | A1* | 5/2010 | Bagepalli | F03D 80/50 |
| | | | | 416/61 |
| 2012/0201693 | A1* | 8/2012 | Pettersson | F03D 1/0658 |
| | | | | 416/244 R |
| 2012/0263602 | A1* | 10/2012 | Booth | H02K 5/22 |
| | | | | 416/244 R |
| 2013/0236311 | A1 | 9/2013 | Segovia et al. | |
| 2013/0302175 | A1* | 11/2013 | Munk-Hansen | F03D 80/00 |
| | | | | 416/245 R |
| 2015/0023794 | A1 | 1/2015 | Ebbesen | |
| 2015/0219073 | A1* | 8/2015 | Baumgaertel | F03D 80/50 |
| | | | | 416/1 |
| 2015/0285218 | A1 | 10/2015 | Christoffersen | |
| 2015/0354233 | A1* | 12/2015 | Ebbesen | F03D 1/0691 |
| | | | | 182/222 |

FOREIGN PATENT DOCUMENTS

| | | |
|---|---|---|
| EP | 1925860 A1 | 5/2008 |
| EP | 2484893 A2 | 8/2012 |
| WO | WO 2014108216 A1 | 7/2014 |

* cited by examiner

MAINTENANCE ACCESS TO BLADE BEARING

CROSS-REFERENCE TO RELATED APPLICATION

This application claims priority to European Application No. 15184070.9 having a filing date of Sep. 7, 2015 the entire contents of which are hereby incorporated by reference.

FIELD OF TECHNOLOGY

The following relates to an improved access to the bearing of a wind turbine rotor blade.

BACKGROUND

A wind turbine transforms the energy of the wind into electrical energy. Therefore the wind turbine comprises a rotor, comprising a hub and rotor blades. The rotor blades interact with the wind.

The wind rotates the rotor of the wind turbine. The rotation is transferred to an electrical generator and is transformed into electrical energy.

The rotor blades are rotatable around their longitudinal axis to regulate the influence of the wind on the rotor of the wind turbine. The rotor blades are connected to the hub via a bearing to allow this rotation. The rotor blade is connected to the bearing by bolts and the bearing is connected to the hub by bolts.

A wind turbine is planned to have a lifetime of around 20 years or more. Service and maintenance is necessary during the lifetime of the wind turbine. Also the blade bearing is subject to maintenance and service. This may include inspection of the bearing, retightening the bolts, or exchanging the sealing of the bearing.

To perform the maintenance, access needs to be provided to the bearing, so that workers can reach the respective parts of the bearing. The maintenance and service work at the hub is performed at the wind turbine at hub height. The hub height of a wind turbine often is 80 meters and more, nowadays the hub height can also exceed 100 meters.

Service and maintenance work needs to be performed at both sides of the bearing. Thus the bearing needs to be accessed from the inside and from the outside. Thus workers need to access the rotor blade bearing from outside of the hub, too. The hub of the wind turbine is a casted piece of metal. Often the hub is covered by a spinner housing. The worker can access the bearing from the space between the hub and the spinner housing.

In the last few years the wind turbines get more powerful and thus the wind turbine itself gets bigger.

With the increasing size of the wind turbine, the hub is no longer covered by a spinner housing. Thus the maintenance work needs to be performed from outside the hub. Thus the worker needs to leave the hub at a hub height of for example 100 meters, and needs to perform the work as an outside work. The worker is thus exposed to wind and weather. The maintenance work in addition bears a safety risk for the worker. Some countries already prohibit the work to be performed outside of the wind turbine housing.

The aim of the invention is therefore to provide an improved access to the rotor blade bearing to perform maintenance and service work at the bearing.

SUMMARY

An aspect relates to a rotor of a wind turbine comprising a rotor blade and a hub, whereby the rotor blade comprises a root end, and the root end is attached to the rotor blade bearing. The rotor blade bearing is attached to the hub.

The rotor blade comprises a root section adjacent to the root end comprising the outer surface of the rotor blade. The root section of the rotor blade is covered by a housing.

The housing comprises a wall section that leads at least partially circumferentially around the root section of the rotor blade. The housing comprises a cover section to at least partially close the gap between the wall section of the housing and the rotor blade.

The housing defines an aisle that leads circumferentially around the root section of the rotor blade to provide access to the blade bearing and to allow a worker to perform service work at the blade bearing.

The rotor of a wind turbine comprises a rotor blade and a hub. Nowadays wind turbines comprise preferably three rotor blades.

A rotor blade comprises a root end that is connected to the hub. The root end of the rotor blade is connected to the hub via a blade bearing that allows a pitch movement of the rotor blade in relation to the hub. The pitch movement of a rotor blade is a rotational movement around the longitudinal axis of the rotor blade. Adjacent to the root end of the rotor blade is a root section.

The blade bearing connects the rotor blade to the hub. Service and maintenance work needs to be performed at the blade bearing on a regular basis. Therefore, a worker needs to access the blade bearing.

The blade bearing can only be accessed from the outside of the hub. Nowadays wind turbines have a hub height of around 100 meters. A worker who has to leave the interior of the nacelle or hub at a height of around 100 meters, to perform service work at the blade bearing, is exposed to wind and weather conditions.

To protect the worker, and to allow the service and maintenance work, the root section of the rotor blade including the blade bearing is covered by a housing.

The housing comprises an aisle that allows the access to the blade bearing. The aisle is defined by the outer surface of the root section of the rotor blade at the inner side. The outer side of the housing is defined by a wall that leads in a certain distance at least partially circumferentially around the root section of the rotor blade. In addition the housing comprises a cover section to cover the aisle in the housing, whereby the cover section at least partially closes the gap between the wall section of the housing and the root section of the rotor blade.

Thus, the aisle is defined by the housing that leads circumferentially around the root section of the rotor blade. The aisle can be accessed by the worker and from the aisle the worker can perform service work at the blade bearing.

Thus the worker performing service work at the blade bearing is not subject to wind and weather conditions. The worker does not need to leave the closed premise of the housing to perform service work.

The rotor comprises a cavity suitable for a worker to pass through and the cavity is in communication with the aisle by at least a manhole.

The worker needs to be able to access the housing at a root end of the rotor blade. Normally a worker accesses the wind turbine through a tower and the nacelle. From the nacelle the worker can, for example, enter a cavity in the hub of the rotor of the wind turbine.

The cavity in the hub can be connected to the housing at the rotor blade through a manhole. The worker can also pass on from the cavity in the hub of the rotor through a cavity in the rotor blade.

From there a manhole can lead from the inner side of the rotor blade into the housing at the root end of the rotor blade.

Thus, the worker can access the aisle in the housing to perform the service work at the blade bearing without leaving the closed environment of the wind turbine.

The cavity of the rotor is in the rotor blade and the manhole is in the wall of the root section of the rotor blade to access the aisle.

The worker can pass from the inner side of the hub into the interior of the rotor blade. A manhole in the wall of the root section of the rotor blade provides an access to the aisle in the housing of the rotor blade.

Thus, the aisle in the housing can be directly accessed from a cavity inside of the rotor of the wind turbine.

The wall of the housing comprises an opening to access the aisle of the housing.

The wall of the housing leads at least partially circumferentially around the root section of the rotor blade. The wall of the housing comprises an opening to allow an access to the aisle within the housing.

Thus, the worker can access the aisle within the housing through an opening in the wall of the housing at the root section of a rotor blade.

The cavity of the rotor is in the hub whereby the wall of the hub comprises a manhole, and the cavity is in communication with an opening in the wall of the housing by the manhole and a channel that is suitable for a worker to pass through.

The hub of the rotor of the wind turbine comprises a manhole.

The wall of the housing comprises an opening. The manhole in the hub and the opening in the wall are connected by a channel. A worker can access the channel from the hub through the manhole and from there continue through the opening in the wall of the housing into the housing and thus to the aisle.

Thus, the worker can reach the aisle in the housing without leaving the closed environment of the interior of the wind turbine. Thus, the worker is not subject to wind and rain, and is protected by the closed environment.

The manhole is located in the wall of the hub close to the opening in the wall of the housing of the rotor blade.

Thus, the distance between the manhole and the opening is quite short and the length of the channel is minimized.

The manhole is located in the front wall of the hub, seen from the direction of the wind, and the channel, suitable for a worker to pass through, is connecting the manhole and the opening in the wall of the housing.

Thus, in the case of a plurality of rotor blades at the hub of the rotor only one opening in the hub is needed to access the blade bearings of the rotor blades.

The rotor comprises three rotor blades whereby each rotor blade comprises a housing, and the channels to access the aisles in the housings are connected at a manhole in the front wall of the hub.

Nowadays wind turbines comprise three rotor blades. Each rotor blade comprises a housing to access the blade bearing. A manhole is arranged on the front wall of the hub of the wind turbine.

The manhole in the front of the hub of the wind turbine and the housings are connected by a channel each. The three channels to access the three housings are connected at a manhole in the front of the hub.

Thus, the channel system comprises a star-shaped form. Only one manhole is needed to access all three housings of the rotor blades. A manhole in the front of the hub is then covered by the channel system.

The channel comprises a ladder.

The channel to reach the housing at the root section of the rotor blade might be several meters long. A ladder is present within the channel to allow the worker to access the housing.

A method is disclosed to perform service at the blade bearing of a wind turbine. A rotor of a wind turbine comprises a rotor blade, a hub and a rotor blade bearing connecting the rotor blade and the hub.

The root section of the rotor blade is covered by a housing, whereby the housing comprises an aisle that leads at least partially circumferentially around the root end of the rotor blade to provide access to the blade bearing.

The rotor of the wind turbine comprises a cavity accessible from within the wind turbine and the cavity of the rotor is in communication with the aisle in the housing by at least a manhole.

The method comprises the steps of accessing the aisle of the housing from the cavity in the rotor and performing service work at the blade bearing of the rotor.

A worker can access the aisle in the housing and can then perform service work at a blade bearing. Thus the service work at a blade bearing can be performed without the necessity for worker to leave the closed environment of the wind turbine. Thus, the worker is not exposed to wind and rainy conditions.

The rotor comprises at least two rotor blades and the method comprises the additional steps of rotating the rotor of the wind turbine until a rotor blade reaches a position mainly vertically above the hub and performing service work at the bearing of the rotor blade in the position mainly vertically above the hub.

To access the blade bearing in a comfortable manner the rotor is rotated until the respective rotor blade where the service shall be performed at the blade bearing reaches a position mainly vertically above the hub. Thus, the blade bearing is oriented mainly horizontally.

Also the housing leading around the root section of the rotor blade is in a mainly horizontal position. Thus, the aisle can be used by the worker to perform the service work at a blade bearing while the aisle leads mainly horizontally around the wind turbine rotor blade and the blade bearing.

The rotor is rotated until the rotor blade reaches the mainly vertical position above the hub. The worker can access the aisle leading around the rotor blade through at least one manhole and the worker can then perform the service work at a bearing of the rotor blade in a comfortable manner.

The method comprises the additional steps of leaving the housing of the rotor blade, rotating the rotor until a second rotor blade reaches the position mainly vertically above the hub, entering the housing of the second rotor blade, and performing service work at the blade bearing of the second rotor blade.

When the worker has finished the work at the first blade bearing of the first rotor blade, the worker is leaving the housing of the rotor blade through the manhole and the rotor is rotated until a second rotor blade reaches the position mainly vertically above the hub.

The worker can then enter the housing of the second rotor blade and perform the service work at a blade bearing of the second rotor blade. The aisles in the housing of the second rotor blade are then in the position where they are oriented mainly horizontally and the worker can perform the service work in a comfortable manner.

Thus, a plurality of rotor blades at the rotor of a wind turbine can be serviced in a comfortable and safe manner. The worker can perform the service work in a safe environment without the need to get to the outside of the hub. Thus the service work can also be performed faster and thus cheaper.

BRIEF DESCRIPTION

Figure 2:
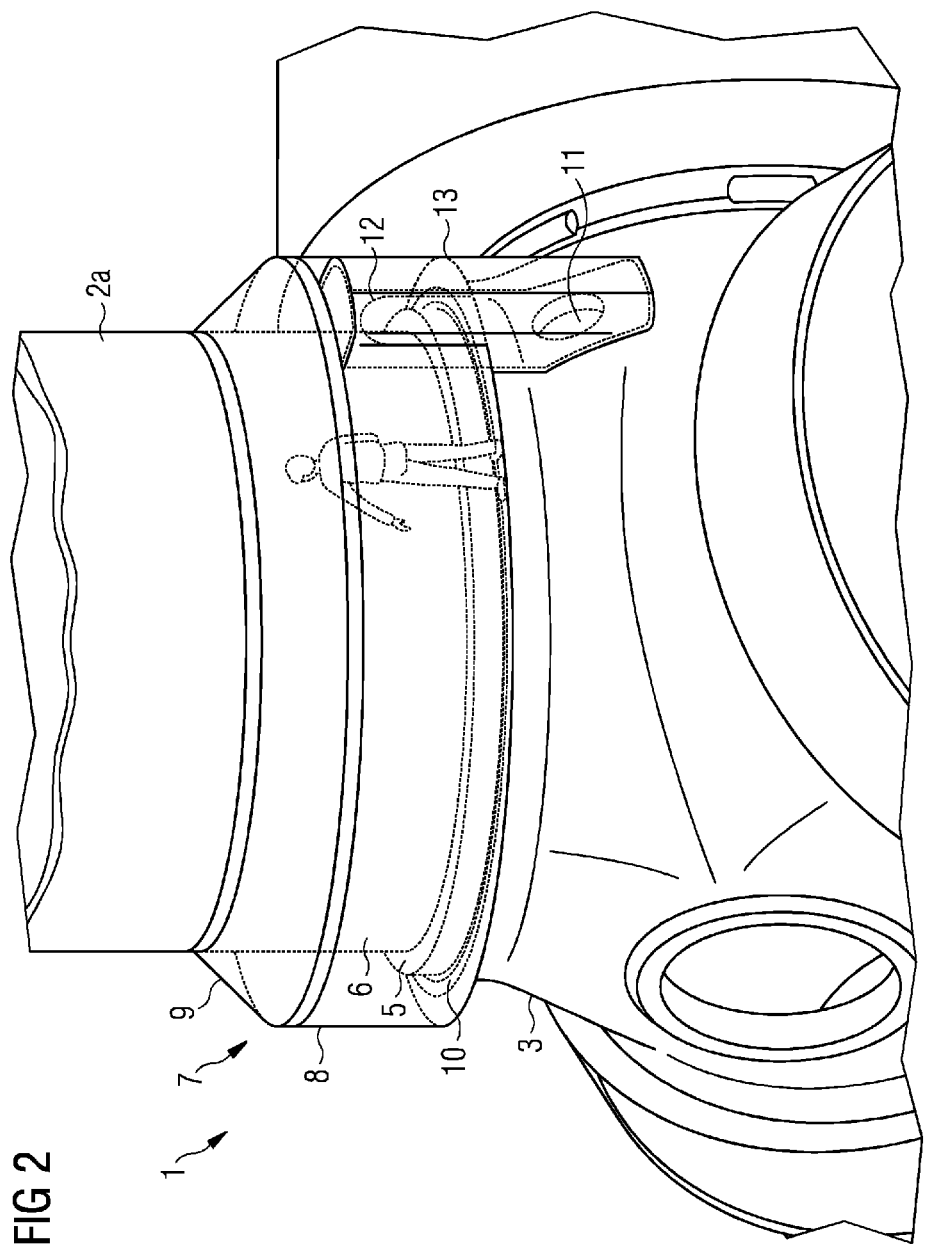
Figure 3:
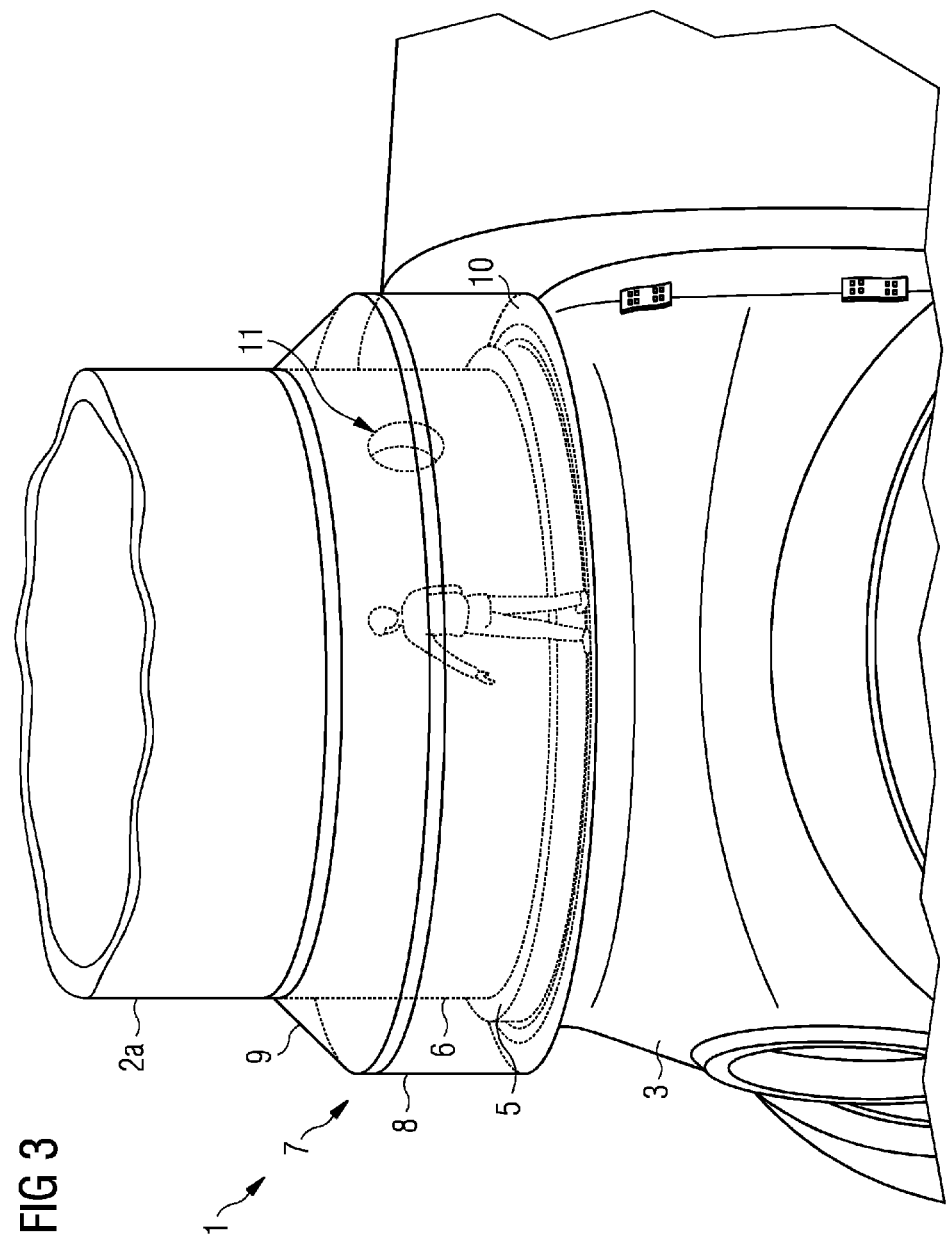
Figure 4:
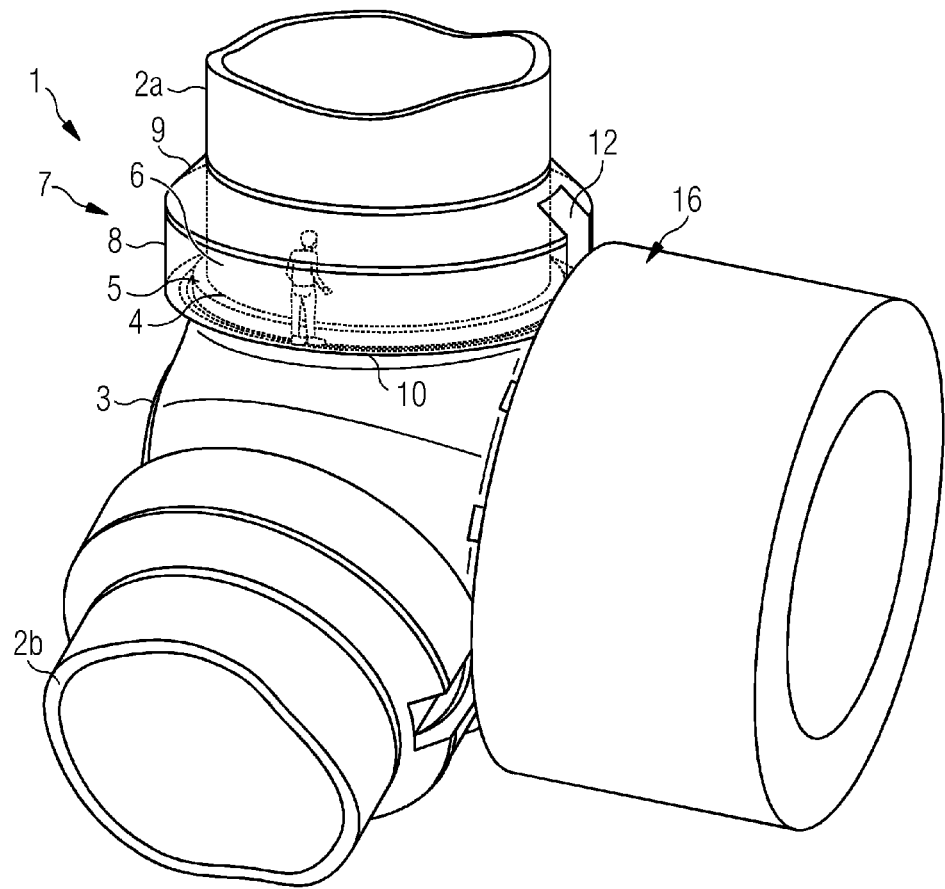
Figure 5:
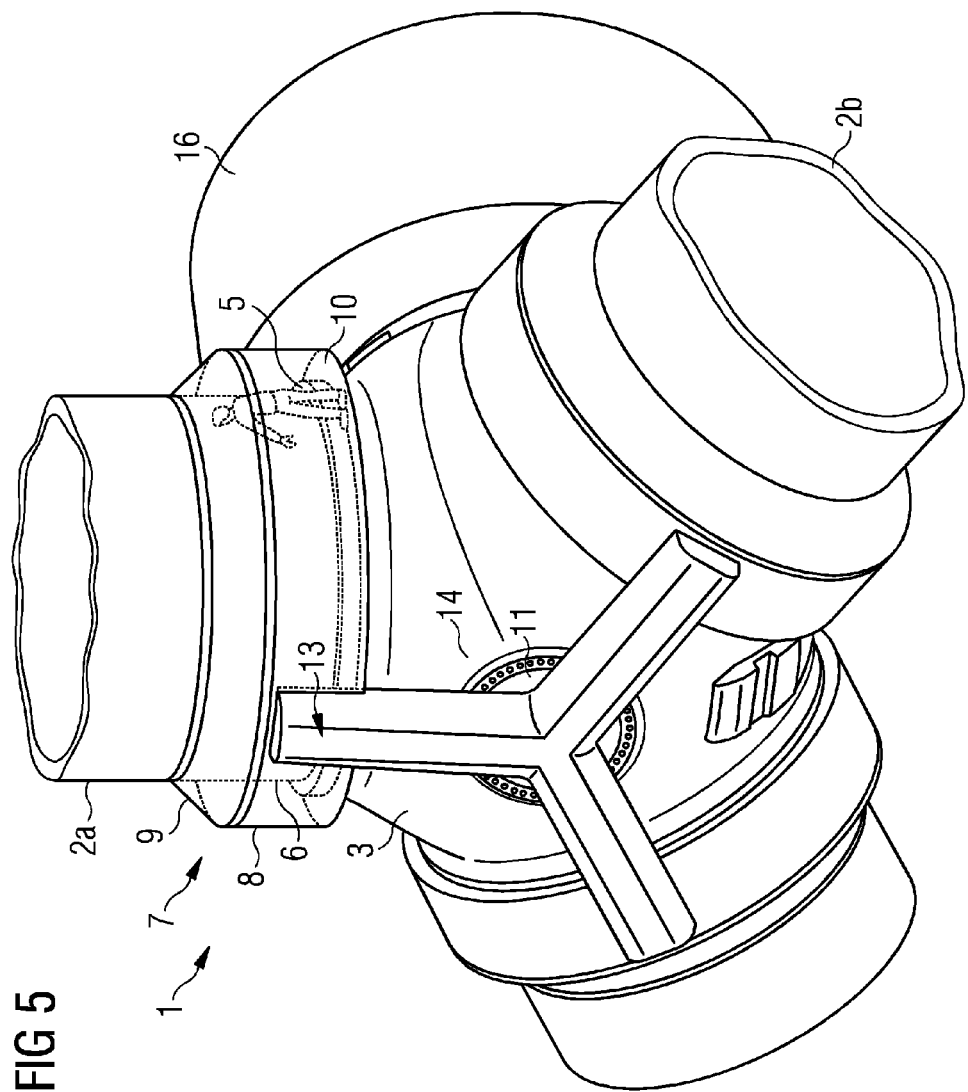

Some of the embodiments will be described in detail, with reference to the following figures, wherein like designations denote like members, wherein:

FIG. 1 shows a rotor of a wind turbine with a housing;
FIG. 2 shows a detailed view of the housing;
FIG. 3 shows another embodiment of the housing;
FIG. 4 shows a different embodiment of the housing; and
FIG. 5 shows another embodiment of the channel.

DETAILED DESCRIPTION

FIG. 1 shows a rotor of a wind turbine with a housing.

FIG. 1 shows a rotor 1 of a wind turbine with a housing 7. The rotor 1 comprises a rotor blade 2a and a rotor blade 2b. The rotor blades 2a, 2b are connected to the hub 3 by a pitch bearing.

The access to the pitch bearing is provided through a housing 7. The housing 7 is arranged around the root section of the rotor blade 2a, 2b, whereby the housing 7 comprises a wall 8 and a cover section 9. The wall 8 and the cover section 9 are arranged to build a mainly closed housing 7. The housing 7 is leading around the root section of the rotor blade 2a, 2b and is dimensioned in a way that a worker can access the bearing through the housing 7.

The hub 3 comprises a cavity that is accessible from the interior of the wind turbine. The cavity in the hub 3 is connected to the aisle in the housing 7 by a channel 13. A worker can access the channel 13 through a manhole in the wall of the hub 3.

The channel 13 comprises a ladder so that the worker can access the aisle within the housing 7. In the housing 7 the worker can perform service and maintenance work at the blade bearing.

FIG. 2 shows a detailed view of the housing.

FIG. 2 shows a more detailed view of the housing 7 of the rotor 1 of the wind turbine. The rotor 1 comprises a hub 3 and rotor blades 2a, 2b. The rotor blade is connected to the hub 3 by a bearing 5.

The bearing 5 is arranged at the root end of the rotor blade 2a. Adjacent to the root end of the rotor blade 2a is a root section 6. The root section 6 comprises the outer wall of the rotor blade 2a.

The root section 6 of the rotor blade 2a is covered by a housing 7. The housing 7 comprises a wall 8 that leads at least partially circumferentially around the root section 6. The housing 7 comprises a cover section 9 that leads at least partially around the root section 6 and covers the gap between the wall 8 and the outer wall of the rotor blade 2a.

Thus, the housing 7 builds an aisle 10 that can be used by a worker to access the blade bearing 5. The aisle 10 can be accessed through a channel 13. The channel 13 connects a manhole 11 with an opening 12 in the housing 7.

The channel 13 can be equipped with a ladder that is not shown in FIG. 2. A worker can access the cavity in the hub 3 from the nacelle of the wind turbine. The worker can use the manhole 11 to enter the channel 13, and the opening 12 in the wall 7 to enter into the housing 7 to perform service and maintenance work at the blade bearing 5.

FIG. 3 shows another embodiment of the housing 7.

The rotor 1 comprises a hub 3 and a rotor blade 2a. The rotor blade 2a is connected to the hub 3 via a bearing 5. The bearing 5 is connected to the root end of the rotor blade 2a. Adjacent to the root end of the rotor blade 2a is a root section 6.

The root section 6 is covered by a housing 7. The housing 7 comprises a wall 8 and a cover section 9. The root section 6 of the rotor blade 2a comprises a manhole 11.

A worker can access the interior of the housing 7 from the interior of the rotor blade through the manhole 11. Within the housing 7 an aisle 10 is provided for the worker to perform service and maintenance work at the bearing 5.

FIG. 4 shows a different embodiment of the housing 7.

The rotor 1 comprises a hub 3 and a rotor blade 2a, 2b. The rotor blade 2a, 2b is connected to the hub 3 by its root end 4. The rotor blade 2a, 2b is connected to the hub 3 via a blade bearing 5.

The blade bearing 5 and adjacent root section 6 of the rotor blade 2a are covered by a housing 7. The housing 7 comprises an aisle 10 that allows a worker to perform service and maintenance work at the blade bearing 5.

The worker can access the aisle 10 through an opening 12 in the housing 7. The opening 12 can be accessed through a manhole in the canopy of the nacelle 16 or through the generator housing.

To perform service and maintenance work at the blade bearing 5 the respective rotor blade 2a is positioned in a vertical position above the hub 3. Thus, the aisle 10 in the housing 7 leads mainly horizontally around the root section 6 of the rotor blade 2a.

To perform service and maintenance work at the blade bearing of the rotor blade 2b the hub 3 is turned until the rotor blade 2b reaches the mainly vertical position above the hub 3. Service and maintenance work at the bearing of the rotor blade 2b can then be performed from the aisle 10 in the housing 7 of at the rotor blade 2b.

FIG. 5 shows another embodiment of the channel.

FIG. 5 shows another embodiment of the channel 13. The channel 13 connects a manhole 11 in the front wall 14 of the hub 3 with a housing 7 of a rotor blade 2a, 2b.

In this embodiment the rotor 1 comprises three rotor blades and a hub 3. The three rotor blades are arranged in an angle of 120 degrees around the hub 3. The channel 13 connects all three housings of the three rotor blades with one manhole in the front surface of the hub 3. Thus, the channel 13 comprises a star-shaped form.

A worker can access a cavity within the hub 3 from the nacelle 16 of the wind turbine. The worker can then access the interior of the channel 13 through the manhole 11.

A ladder can be present within the channel 13 for the worker to reach the housing 7. The housing 7 comprises an aisle 10. The aisle 10 is limited by the root section 6 of the rotor blade 2a, the outer wall 8 of the housing 7 and the cover section 9.

From the aisle 10 the worker can perform service and maintenance work at the blade bearing 5. After the work is finished the worker leaves the aisle 10 through the channel 13 and enters the nacelle 16 through the hub 3.

Then the rotor 1 of the wind turbine is rotated by 120 degrees until another rotor blade 2b reaches the mainly vertical position above the hub 3. Then the service and maintenance work at a blade bearing of the second rotor blade 2b can be performed by the worker.

The illustration in the drawings is in schematic form. It is noted that in different figures, similar or identical elements are provided with the same reference signs.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A rotor of a wind turbine, comprising:
   three rotor blades and a hub,
   wherein each rotor blade comprises a root end and the root end is attached to a rotor blade bearing, and the rotor blade bearing is attached to the hub,
   wherein each rotor blade comprises a root section, adjacent to the root end, including the outer surface of the rotor blade,
   wherein the root section of each rotor blade is covered by a housing, wherein both the hub and the housings defining at least a portion of an exterior of the wind turbine,
   wherein each housing comprises a wall section that leads at least partially circumferentially around the root section of the rotor blade,
   wherein each housing comprises a cover section to at least partially close the gap between the wall section of the housing and the rotor blade,
   wherein each housing defines an aisle that leads circumferentially around the root section of the rotor blade to provide access to the blade bearing and to allow a worker to perform service work at the blade bearing.

2. The rotor according to claim 1, wherein the rotor comprises a cavity suitable for a worker to pass through, and the cavity is in communication with the aisle by at least a manhole.

3. The rotor according to claim 2, wherein the cavity of the rotor is in the rotor blade and the manhole is in the wall of the root section of the rotor blade to access the aisle.

4. The rotor according to claim 2, wherein the wall of the housing comprises an opening to access the aisle in the housing.

5. The rotor according claim 4, wherein the cavity of the rotor is in the hub, wherein the wall of the hub comprises a manhole and the cavity is in communication with the opening in the wall of the housing by the manhole and a channel that is suitable for a worker to pass through.

6. The rotor according to claim 5, wherein the manhole is located in the wall of the hub close to the opening in the wall of the housing of the rotor blade.

7. The rotor according to claim 5, wherein the manhole is located in the front wall of the hub seen from the direction of the wind, and a channel suitable for a worker to pass through is connecting the manhole and the opening in the wall of the housing.

8. The rotor according to claim 7, wherein the channels to access the aisles in the housings are connected at the manhole in the front wall of the hub.

9. The rotor according to claim 5, wherein the channel comprises a ladder.

* * * * *